Dec. 22, 1970     M. A. ROCHE, JR     3,549,739
STRENGTHENED ARC CARBON ELECTRODE JOINTS
Original Filed May 12, 1966
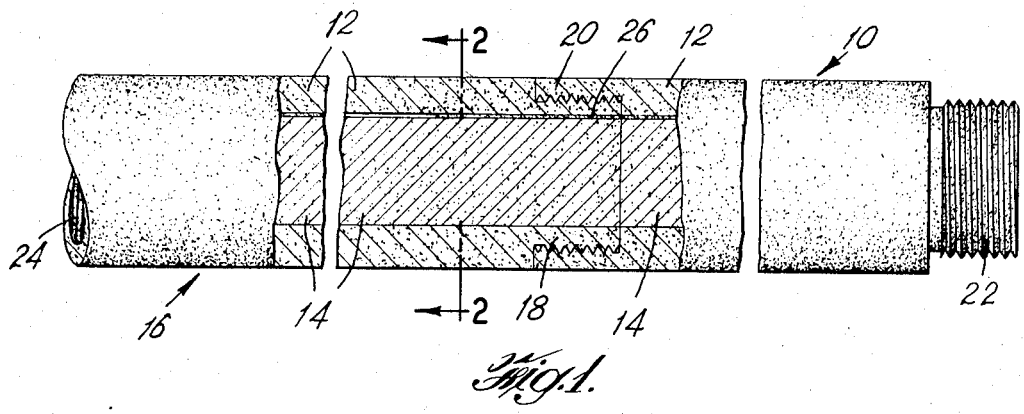
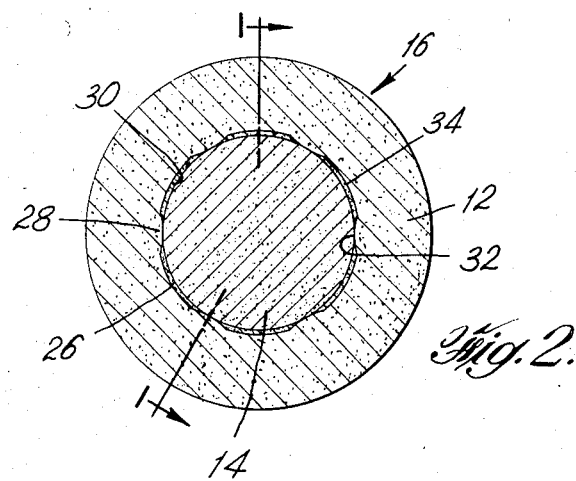
INVENTOR
MARTIN A. ROCHE, JR.
BY
ATTORNEY

# United States Patent Office 3,549,739
Patented Dec. 22, 1970

3,549,739
**STRENGTHENED ARC CARBON
ELECTRODE JOINTS**
Martin A. Roche, Jr., Brook Park, Ohio, assignor to Union
Carbide Corporation, a corporation of New York
Continuation of application Ser. No. 549,670, May 12,
1966. This application Oct. 1, 1968, Ser. No. 764,048
Int. Cl. B28b 11/08
U.S. Cl. 264—162                                  2 Claims

ABSTRACT OF THE DISCLOSURE

A method of effecting an improved bond between a core and a shell in an arc carbon electrode. The shell is provided with a plurality of ribs along its inside surface and the core is pressed within the shell and between the ribs. A cement is then forced between the shell and the core under pressure.

---

The invention described herein was made in the performance of work under a NASA contract and is subject to the provisions of Section 305 of the National Aeronautics and Space Act of 1958, Public Law 85–568 (72 stat. 435; 42 U.S.C. 2457).

This application is a continuation of application Ser. No. 549,670 filed May 12, 1966.

This invention relates to arc carbon electrodes and more particularly to arc carbon electrode joints which have been strengthened to withstand high torsional forces.

Arc carbon electrodes are employed in devices wherein the arc which is struck between a positive carbon and a negative consumable or nonconsumable cathode is employed as a source of illumination. These devices generally require that the arc function continuously for an indefinite duration of time as, for example, in a solar simulation device, or that it function continuously for a definite period of time such as in certain types of searchlight apparatus. Providing sufficient lengths of carbon electrodes to sustain an arc for the desired duration is accomplished by joining electrodes together. This method, in effect, produces endless carbons and may be accomplished in practice without interrupting the arc by threading a new carbon into the nonburning end of another carbon before the latter is entirely consumed by the arc.

A variety of carbon electrode compositions and constructions are combined in an attempt to improve the desired characteristics of a particular arc. A commonly known and often used electrode, for example, comprises a carbonaceous shell and a core each of which may be composed of a number of suitable materials. The thickness of the shell is an important consideration in this type of electrode. Normally, the diameter of the core is approximately ⅔ the outside diameter of the electrode. The shell thickness therefore is usually about ⅙ the diameter of the electrode. Electrodes which are constructed entirely of core material are not used since the core material includes metal salts which consume rapidly and develop a gas envelope (plasma) which must be contained by the shell in order to sustain arc operation.

Another important consideration in carbon electrodes which are composed of a core and a shell and which are to be joined together end to end as hereinbefore described is the strength of the bond between the core and shell. A weak union of shell and core often results in an easy breakage of the joint which is formed by connecting two electrodes end to end. In an effort to increase the strength of the connection between the shell and core, a wide variety of cements have been used. These cements are usually applied to the outer-surface of the core or on the inside surface of the shell prior to inserting the core into the shell.

It is the primary object of this invention to provide a method whereby the strength of the core-to-shell bond in an arc carbon electrode is increased.

It is another object of this invention to provide a strengthened joint when arc carbon electrodes are connected end to end.

Other objects and advantages of the invention will become apparent from the following description, taken in conjunction with the following drawing wherein:

FIG. 1 is a partial cross-sectional view of arc carbon electrodes which have been joined end to end; and
FIG. 2 is a section taken along lines 2—2 of FIG. 1.

Broadly, the objects of this invention are accomplished by forcing a cement under pressure into the void between core and shell of an arc carbon electrode. The cement employed may be any of the many suitable cements presently used in the art for core to shell bonding. Most of the cements which are used for this purpose have a low viscosity and may therefore be readily forced between core and shell at a pressure less than that at which the shell would rupture. These cements, however, lose their bonding characteristics when they are pyrolyzed to high temperatures. Yet, if the cements are not pyrolyzed to these temperatures, condensible volatiles will form during the period when the electrode is being consumed in the arc and will attack the electrical contacts in the illumination device. Therefore, it is preferable to employ cement systems which retain adequate bonding strength after being pyrolyzed at high temperatures. One such cement is disclosed in U.S. application, Ser. No. entitled, "Strengthened Arc Carbon Electrode Joint," filed concurrently herewith. Such a cement contains relatively large amounts of hardeners and inert fillers which increase the viscosity of the cement system to the level where it becomes impractical to force the cement between a core and a shell since the shell will rupture. In accordance with this invention, therefore, best results are achieved when core and shell are substantially equally spaced prior to forcing the cement therebetween. The preferred method of the invention includes the placing of a plurality of ribs on the inside surface of the shell of an arc carbon electrode. The core when placed inside a ribbed shell is, if the ribs are properly positioned, centered with respect to the inside diameter of the shell and thus a cement may be forced uniformly between the shell and core. In this manner, cement is symmetrically interposed around approximately 360° of the core surface and a rigid bond is insured.

Referring now to FIG. 1, a carbonaceous electrode 10 comprising an outer shell 12 and an inner core 14 is in direct communication with a similar carbonaceous electrode 16. The electrode 16 has a threaded protrusion 18 which fits into a threaded recess 20 in the other electrode 10. On the oppoite ends of these electrodes 10 and 16 are a threaded protrusion 22 and a threaded recess 24 respectively thereby providing each electrode with a protrusion at one end and a recess in the other end. A cement 26 is interposed between the outer shell 12 and the inner core 14.

In FIG. 2, the shell 12 is illustrated as having a plurality of ribs 28 which extend along its inner surface 30. The ribs 28 are in contact with the periphery of the core 14 at various points 32. The cement 26 is forced into place in the annular space 34 between the core 14 and the inner surface 30 of the shell 12. The ribs properly align the periphery of the core 14 with respect to the inner surface 30 of the shell 12. As a result, the cement 26 is symmetrically distributed about the entire periphery of the core. Thus, a strong bond is effected between the core 14 and the shell 12.

The ribs are preferably about .006″ deep and .030″ wide at their base and preferably extend along the entire length of the shell. Ideally, a straight core and shell with true roundness require only three ribs displaced approximately 120° to center the core. Because of the nominal tolerances of the dimensions of the shell and core, additional ribs are generally required. It has been found that six ribs spaced approximately 60° apart on the inside surface of the shell are sufficient. It will be appreciated that variations in the number of ribs may be employed without adversely affecting the strength of the bond achieved. For best results, the ribs are substantially equally spaced about the inside surface of the shell.

During assembly, the carbonaceous shell is clamped while a core is placed therein. A cement is then forced into the annular space between the core and shell under a pressure sufficient to cause the cement to flow into the space, but less than the rupture strength of the shell. The pressure to be employed will depend on a number of factors such as the viscosity of the cement, the size of the annular space into which the cement must flow, the desired depth of penetration of the cement within the electrode, the rupture strength of the shell, etc. It will be appreciated, however, that it is well within the skill of an artisan to determine a suitable pressure to employ. In addition, any suitable device may be used to apply the required pressure such as a standard "grease gun" or a positive displacement pump. After the cement is interposed between core and shell, it is cured and then pyrolyzed in situ.

In order to test the effectiveness of the invention, several electrodes each having a non-ribbed shell which was bonded to a core by a cement forced therebetween at a pressure of 1,000 p.s.i. by means of a grease gun were joined end to end in the manner illustrated in FIG. 1 and tested for torsional breaking strength. The cement penetrated a depth of approximately 3 inches along each end of the electrodes. Several other electrodes also having nonribbed shells, but having the same cement interposed between the core and shell by painting the surface of the core with the cement prior to insertion into the shell, were similarly tested.

The test equipment consisted of a turret lathe with the turret replaced by torque transmitting and sensing devices which were mounted on the lathe ways. The torque transmitting members included a collet chuck and a connecting shaft cradled by two bearings which were coaxially mounted with the lathe spindle. The connecting shaft was joined directly to the shaft of a bracket-mounted torque sensing device. A strain gauge recorder amplified the signal from the electrical resistance strain gauge of the torque sensor and recorded the results on a chart. The connecting shaft was designed to allow the collet chuck to travel axially during the assembling and testing of a joint.

The electrode sections which were tested were 5" long and included shells with a wall thickness of approximately .090" and a diameter of approximately .630". The shells and cores were composed of the following materials: the shell was composed primarily of artificial graphite bonded with a coal tar pitch which had been pyrolyzed at 1000–1400° C.; the core was composed of natural graphite and metal salts bonded together with a coal tar pitch which was pyrolyzed at 750–1000° C. The resinous cement which was employed in each of the electrodes was composed of 50 percent diglycidyl diether of bisphenol F, 25 percent BRP–5012 (a powdered phenol resin manufactured by Union Carbide Corporation, New York, N.Y.) Bakelite[1] phenolic resin, 12.5 percent furfuryl alcohol and 12.5 percent furfuryl aldehyde. The cement in the assembled electrodes was cured in air for eight hours at 110° C.

After the cement had been cured, the carbon electrode sections were machined to provide protrusions and recesses in such a manner that joints could be formed by the threading of a protrusion into a recess. The protrusions and recesses were fitted with 9/16–18 NS truncated forms attainable with standard taps and dies. The strength of the core to shell bond was determined by measuring the torque which was required to break the joints. It has been found that in joints formed by 9/16–18 NS truncated thread electrodes having an adequate bond between the shell and core, the protrusion exceeds the strength of the recess to which it is joined. Therefore, when the torque which is required to break such joints is generated, the point of failure should be in the shell wall of the recess. The location of the break is then an indication of the strength of the bond between the core and shell. If the recess cracks, the strength of the core to shell bond is adequate. If, on the other hand, the shell wall on the protrusion breaks away from the core, the strength of the bond is inadequate. The following table lists the torque which was required to break the joints on each group of the samples tested.

TABLE 1.—TORQUE REQUIRED TO BREAK JOINTS

| Test Number | Cement painted on cores, torque in.-oz. | Type of breakage | Cement forced into annular space between core and shell, torque in.-oz. | Type of breakage |
| --- | --- | --- | --- | --- |
| 1 | 255 | Recess broke | 290 | Recess alone broke. |
| 2 | 235 | Protrusion broke | 265 | Do. |
| 3 | 245 | Recess broke, protrusion cracked | 275 | Do. |
| 4 | 230 | Recess broke | 295 | Do. |
| 5 | 200 | do | 320 | Do. |
| 6 | 270 | Recess broke, protrusion cracked | 275 | Do. |
| 7 | 270 | Recess broke | 280 | Do. |
| 8 | 250 | Recess broke, protrusion cracked | 305 | Do. |
| 9 | 250 | Recess broke | 380 | Do. |
| 10 | 250 | do | 275 | Do. |
| 11 | | | 265 | Do. |

As indicated in the table, the joints which were formed with the carbon electrodes having the cement interposed between shell and core by pressure injection were much stronger than those which were formed by electrodes having cement interposed by the conventional method of painting the core. The average torque required to break the joints on electrodes formed by the injection method is higher than on those formed on electrodes prepared by the painting method. Most importantly, there were no failures due to the protrusion cracking or breaking when the injection method was used. Thus, it is readily apparent that electrodes which are assembled in accordance with the principles of this invention are clearly superior to those which are constructed in a conventional manner.

What is claimed is:

1. A method of fabricating a joinable arc carbon electrode having a core and shell comprising:
   (a) providing said shell with a plurality of inwardly protruding ribs extending along the inside surface of said shell;
   (b) placing said core within said shell and centering said core therein by having the outer surface of the core contact substantially all the protruding ribs thereby providing longitudinal cavities each of which ---
[1] Registered trademark of Union Carbide Corporation, New York, N.Y., used for a group of resinous and plastic materials.

is defined by a pair of adjacent ribs, the outer surfaces of the core and the inner surface of the shell;

(c) forcing a cement into said cavities under pressure sufficient to cause said cement to flow therein but less than the rupture strength of the shell;

(d) curing said cement to effect a bond between the shell and core;

(e) machining one end of the electrode to provide an internally threaded recess; and (f) machining the other end of the electrode to provide an externally threaded protrusion.

2. The method of claim 1 wherein the steps of placing said ribs substantially equally spaced about the inside surface of the shell and extending said ribs along substantially the entire length of the shell are added.

References Cited
UNITED STATES PATENTS

| | | | |
|---|---|---|---|
| 2,726,357 | 12/1955 | Sachs | 287—20.92EX |
| 3,048,433 | 8/1962 | Doetsch | 287—127E |
| 3,313,476 | 4/1967 | Lauzau et al. | 287—127EX |

FOREIGN PATENTS

| | | | |
|---|---|---|---|
| 773,579 | 5/1957 | Great Britain | 287—127E |

DAVID J. WILLIAMOWSKY, Primary Examiner

W. L. SHEDD, Assistant Examiner

U.S. Cl. X.R.

29—474.3; 156—48; 264—29, 262; 287—127